United States Patent [19]

Plavsity

[11] 4,227,395
[45] Oct. 14, 1980

[54] TUBE CRIMPING DEVICE
[75] Inventor: Louis Plavsity, Barberton, Ohio
[73] Assignee: The Babcock & Wilcox Company, New Orleans, La.
[21] Appl. No.: 24,236
[22] Filed: Mar. 26, 1979
[51] Int. Cl.³ .......................... B21D 41/04
[52] U.S. Cl. .................... 72/402; 72/452; 72/453.03
[58] Field of Search ............... 72/402, 452, 453.03, 72/410, 416, 414

[56] References Cited

U.S. PATENT DOCUMENTS

| | | | |
|---|---|---|---|
| 1,078,705 | 11/1913 | Tevander | 72/452 |
| 1,720,133 | 7/1929 | Le Roy | 72/452 |
| 3,155,137 | 11/1964 | Stoltz | 72/402 |
| 3,427,837 | 2/1969 | Faulconer | 72/453.03 |
| 3,772,907 | 11/1973 | Rider | 72/453.03 |
| 4,109,504 | 8/1978 | Rommel | 72/453.03 |

*Primary Examiner*—Francis S. Husar
*Assistant Examiner*—Gene P. Crosby
*Attorney, Agent, or Firm*—Robert J. Edwards; Edward A. Steen; Stephen R. Doody

[57] ABSTRACT

An apparatus (10) for crimping the ends of tubes (44) preparatory to their removal from a tube support structure (46). Accordingly, the apparatus (10) is provided with a plurality of radially spaced serrated members (24A, 24B, 24C and 24D) pivotally mounted within a housing (12). The members (24A, 24B, 24C and 24D) are equipped with rollers (32A, 32B, 32C and 32D) in registry with a retractable cone (34) disposed within the housing (12). An elastic O-ring (38) circumscribes each member (24A, 24B, 24C and 24D).

6 Claims, 2 Drawing Figures

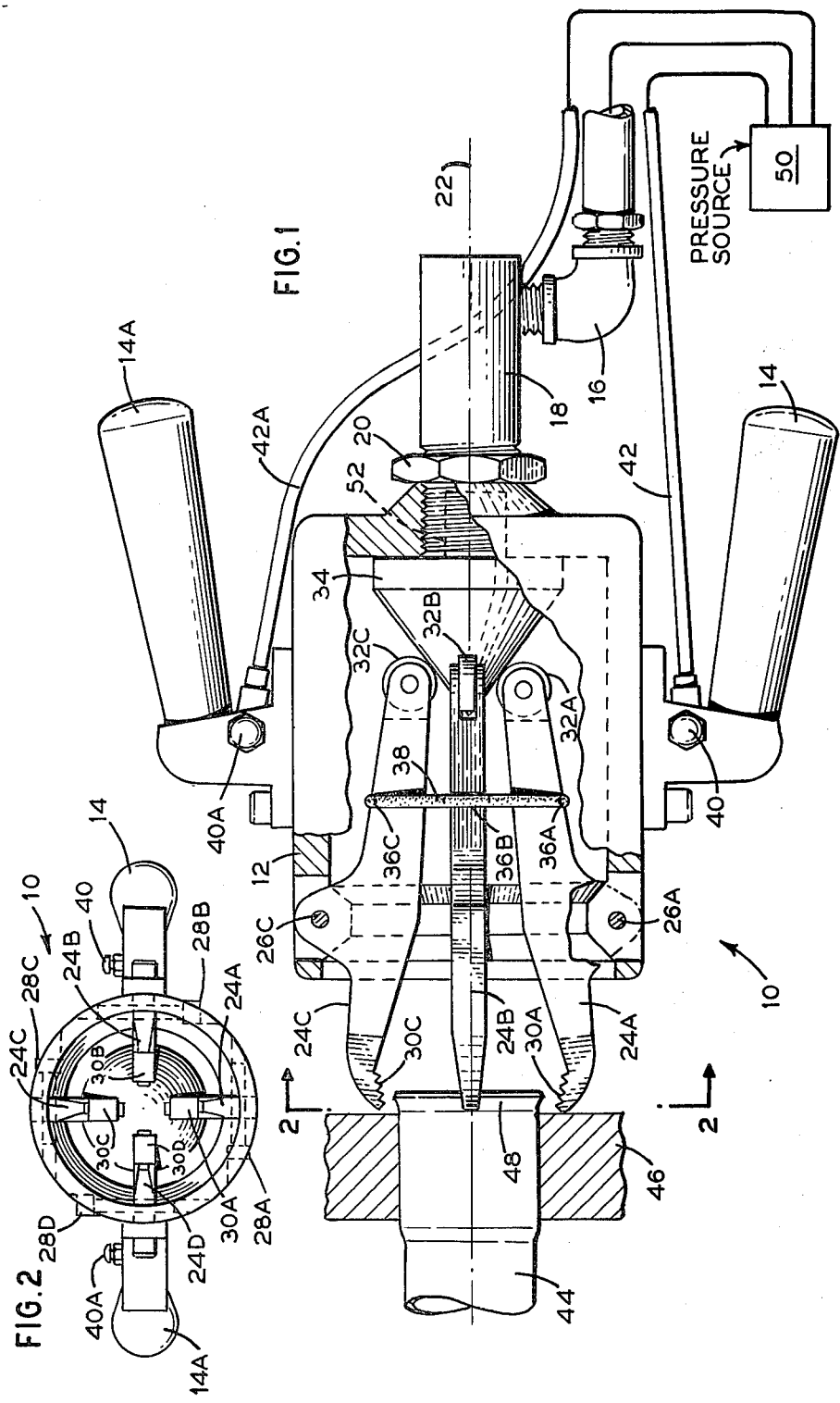

TUBE CRIMPING DEVICE

TECHNICAL FIELD

This invention relates to the art of tube pulling in general and more specifically to an apparatus designed to prepare a tube for expeditious removal from tube sheets and similar tube supporting structures.

BACKGROUND ART

During the normal course of heat exchanger operation, it is oftentimes necessary to replace defective heat exchanger tubes. Constant exposure to the combined debilitating effects of high temperatures, vibration, sooting and corrosion eventually take their toll in tubes. As a consequence, various techniques and apparatus have been developed for the removal of the failed tubes.

One common tube pulling method utilizes a hydraulically driven expandable gripping element. The gripping element is initially inserted into the tube to be removed. The element is subsequently radially expanded (usually by the hydraulic means) so that it is tightly wedged against the inner surface of the tube. The tube is then removed by forcibly extracting the combined tube/gripping element assembly from the tube sheet supporting the tube.

A second common method entails the use of a cutting torch to remove the flared portion of the tube extending beyond the tube sheet. After the flare has been cut, the tube is then manually banged out of the tube sheet with hammers and chisels.

Unfortunately, both of the above enumerated methods exhibit drawbacks.

The hydraulic tube pullers have been generally limited to thin gage tubing having maximum diameters of less then one inch.

The cutting torch method has been found to damage the tube sheet. In order to burn the tubes out, a valley is invariably carved into the tube sheet by the torch prior to the removal of the tube. This necessitates the need to lay down a weld bead between the newly installed tube and the tube sheet to build up the damaged tube sheet surface. Moreover, the weld bead then must be subjected to a finishing grinding operation. Obviously, this method requires additional time and effort to be successful.

Clearly, a more expeditious apparatus for removing tubes from tube supporting structures is desirable.

SUMMARY OF THE INVENTION

The present invention is directed to an apparatus for crushing or crimping the ends of tubes supported by tube sheets.

Accordingly, there is provided an apparatus having a plurality of radially spaced members pivotably mounted within a suitable housing. One end of each member is formed with a serrated crimping jaw whereas the other end of the member is equipped with a roller. The crimping jaws extend without the housing and are arranged to slip over the ends of tubes mounted within a tube sheet.

A hydraulically driven cone is in registry with the roller end of each member. As the cone is extended through the housing, the cone forces the jaws to converge together. An elastic O-ring circumscribes each member along a single plane to separate the jaws after the cone has been retracted.

Two handles are attached to the exterior of the housing for facilitating hand-held operation. Furthermore, control buttons are located near the handles to regulate the length and duration of cone extension and retraction travel.

BRIEF DESCRIPTION OF THE DRAWING

FIG. 1 is a cross sectional plan view of the invention.
FIG. 2 is an end view of the invention taken along line 2—2 of FIG. 1.

BEST MODE FOR CARRYING OUT THE INVENTION

Referring to FIGS. 1 and 2, there is shown a tube crimping or crushing device 10. The device 10 includes housing 12 and a pair of handles 14 and 14A affixed to the housing 12. Reference line 22 represents the axis of symmetry of the housing 12. A hydraulic cylinder and piston assembly 18 is affixed to the housing 12 through the offices of nut 20. Fluid line 16, connected to pressure source 50, supplies the appropriate hydraulic driving fluid to the cylinder and piston assembly 18.

A plurality of members 24A, 24B, 24C and 24D are pivotally mounted within the housing 12 at pivot points 26A, 26B (not shown), 26C and 26D (not shown) by removable pins 28A, 28B, 28C and 28D respectively. The outwardly extending end sections of each member 24A, 24B, 24C and 24D are formed with serrated crimping jaws 30A, 30B, 30C and 30D respectively. Rollers 32A, 32B, 32C and 32D (not shown) are affixed to the opposite ends of each respective member. Reversible thrust cone 34, detachably affixed to the cylinder and piston assembly 18 by threaded member 52, is in registery with the various rollers.

Each member, respectively, has an associated external groove 36A, 36B, 36C and 36D (not shown) formed along its outer periphery. All of the grooves lie along the same plane and between the pins and the rollers. An elastic O-ring 38 is inserted within the grooves to provide the means for separating the jaws of the members when the cone 34 has been fully retracted. FIG. 1 clearly depicts the jaws in their fully separated or opened position.

Note further that when the cone 34 is in the retracted position, the open jaws are positioned at an angle away from the axis of symmetry 22. This orientation enables the jaws to be positioned about the tube scheduled to be removed.

Control buttons 40 and 40A, adjacently disposed to the handles 14 and 14A, allow the operator to control the movement of the cone 34 and, in turn, the degree and duration of the crimping force exerted by the jaws. Control button 40 is connected to control line 42 whereas control button is connected to control line 42A. The two control lines are, in turn, connected to the pressure source 50. The relationship between the control buttons 40 and 40A, the control lines 42 and 42A and the source 50 will become readily apparent from the ensuing discussion.

FIG. 1 further shows the jaws positioned about a tube 44 mounted within and supported by a tube sheet 46. Flare 48 secures the tube 44 to the tube sheet 46.

The invention and the manner of applying it may, perhaps, be better understood by a brief discussion of the principles underlying the invention.

It has been determined that by first crimping or crushing the ends of tubes supported by tube sheets or the like, the tubes may be then removed from the underlying tube support structure by simply removing them with a hammer and chisel or with a small pneumatic chipping hammer. Note how the previously discussed debilitating step involving a torch, along with the attendant problems resulting therefrom, has been entirely eliminated.

Accordingly, to initiate the crimping action, the device 10 is first positioned over the flared section 48 of the tube 44. Care should be taken so as not to disturb the adjacent tubes (not shown) or the tube sheet 46 itself.

After the device has been correctly positioned, the operator presses control button 40A to initiate the flow of hydraulic fluid into the cylinder and piston assembly 18 from the source 50. This flowing action proceeds to drive the cone 34 (via the assembly 18) against the rollers 32A, 32B, 32C and 32D. By virtue of the mounting geometry, the jaws 30A, 30B, 30C and 30D are forced to converge about the flared end 48 thus crimping the flared end 48.

The button 40A is depressed until the cone 34 travels its full stroke. At this point, the operator then depresses control button 40 to retract the cone 34 and thus release the tube from the grasp of the jaws. The tube has now been sufficiently crimped to allow the tube to pass, unhindered, through the tube support structure.

As was discussed previously, after the tube has been sufficiently crimped, workmen, armed with chipping hammers or scaling hammers, utilize these (and/or other appropriate) tools to drive the tube out of the sheet. Thus, the tube may be removed without any damage to the underlying tube support structure.

Although it is preferable to utilize a rubber O-ring 38, any material may be employed provided that it exhibits the requisite elastic action necessary to return the jaws to their separated position after the cone 34 has been retracted. By the same token, the O-ring 38 must not be too rigid so as to impede the converging action of the jaws when the cone 34 is extending through the housing 12.

The spacing between the jaws may be modified by substituting cones having different angular orientations. In order to remove the cone 34, pins 28A, 28B, 28C and 28D are first removed from the housing, thereby freeing the members 24A, 24B, 24C and 24D. The cone 34 is unscrewed whereupon a new cone is installed in its stead. Moreover, worn cones may be easily replaced in the same manner. Additionally, as illustrated in FIG. 1, it is possible to replace a single worn or broken member without necessitating the removal of any other member. For example, if member 24c were broken, its removal would simply involve removal of pin 28c.

Although any suitable mechanism (hydraulic or otherwise) may be utilized to extend and retract the cone 34 within the housing 12, it has been determined that an "ENERPAC" hydraulic cylinder, model number RC-51-AC8 provides satisfactory service ("ENERPAC" is a trademark of Applied Power Industries, Inc., Milwaukee Wis). This particular device utilizes a single acting spring loaded piston design.

Moreover, although the control aspects of the device 10 have not been discussed in any great detail, it suffices to say that any suitable system for supplying and controlling the flow of pressurized fluid may be successfully employed with the instant invention.

While in accordance with the provisions of the statutes, there is illustrated and described herein specific embodiments of the invention, those skilled in the art will understand that changes may be made in the form of the invention covered by the claims, and that certain features of the invention may sometimes be used to advantage without a corresponding use of the other features.

I claim:

1. An apparatus for crimping the ends of tubes preparatory of their removal from tube support structures, the apparatus comprising a housing, the housing having a central symmetrical axis, a plurality of members pivotally mounted within the housing and equidistantly disposed about the axis, each member having a crimping end extending beyond the housing, roller means attached to the non-crimping end of each member, a movable cone positioned within the housing and in communication with the rollers, means for extending and retracting the cone, and means for separating the crimping ends from one another so as to position the crimping ends at an angle away from the axis of symmetry of the housing when the cone has been retracted.

2. The apparatus according to claim 1 wherein each member is removably attached within the housing by means of a pin, said pin being removably attached to the housing and wherein each pin attachment is independent from all other pin attachments.

3. The apparatus according to claim 2 including a groove formed about the external surface of each member, all of said grooves lying in the same plane, each groove being disposed between the pivot mounting and roller means, and wherein the separating means includes an elastic element circumscribing the members and being positioned within the grooves.

4. The apparatus according to claim 3 wherein the cone is detachably mounted within the housing.

5. The apparatus according to claim 4 wherein handles are attached to the housing.

6. The apparatus according to claim 5 wherein the means for extending and retracting the cone comprise a piston and cylinder assembly attached to the housing, a pressure source, control buttons on the handles and control lines leading from the control buttons to the pressure source.

* * * * *